United States Patent [19]

Kothmann

[11] Patent Number: 4,582,765
[45] Date of Patent: Apr. 15, 1986

[54] FUEL CELL SYSTEM WITH COOLANT FLOW REVERSAL

[75] Inventor: Richard E. Kothmann, Pittsburgh, Pa.

[73] Assignee: The United States of America as represented by the United States Department of Energy, Washington, D.C.

[21] Appl. No.: 295,976

[22] Filed: Aug. 25, 1981

[51] Int. Cl.⁴ .................... H01M 8/00; H01M 8/04
[52] U.S. Cl. ............................... 429/13; 429/26; 429/34; 429/120; 165/97
[58] Field of Search ............... 429/13, 14, 17, 26, 429/34, 24, 120; 165/97

[56] References Cited

U.S. PATENT DOCUMENTS

| | | | |
|---|---|---|---|
| 2,460,499 | 2/1949 | Grace | 257/43 |
| 3,367,413 | 2/1968 | Forster | 165/96 |
| 3,455,743 | 7/1969 | Huebscher et al. | 136/86 |
| 3,467,176 | 9/1969 | Truhan | 165/17 |
| 3,553,023 | 1/1971 | Doyle | 429/13 |
| 3,709,736 | 1/1973 | Adlhart et al. | 429/24 |
| 3,855,001 | 12/1974 | Cheron | 136/86 C |
| 3,923,546 | 12/1975 | Katz et al. | 429/26 |
| 3,978,912 | 9/1976 | Penny et al. | 165/4 |
| 4,007,315 | 2/1977 | Brinkman et al. | 429/62 |
| 4,064,934 | 12/1977 | Kolthoff, Jr. et al. | 165/97 |
| 4,109,705 | 8/1978 | Bergdahl | 165/17 |
| 4,276,355 | 6/1981 | Kothmann et al. | 429/26 |

Primary Examiner—Brian F. Hearn
Assistant Examiner—Stephen J. Kalafut

[57] ABSTRACT

Method and apparatus for cooling electrochemical fuel cell system components. Periodic reversal of the direction of flow of cooling fluid through a fuel cell stack provides greater uniformity and cell operational temperatures. Flow direction through a recirculating coolant fluid circuit is reversed through a two position valve, without requiring modulation of the pumping component.

1 Claim, 4 Drawing Figures

FUEL CELL SYSTEM WITH COOLANT FLOW REVERSAL

BACKGROUND OF THE INVENTION

The invention disclosed herein was made or conceived in the course of, or under, a Contract with the United States Government identified as No. DEN3-161.

FIELD OF THE INVENTION

This invention relates to cooling of fuel cell stacks and more particularly to cooling of stacks through directional control of the cooling medium.

DESCRIPTION OF THE PRIOR ART

Among the various types of fuel cell systems are those which include subassemblies of two bipolar plates between which is supported an electrolyte, such as an acid, in a matrix. The subassemblies, herein referred to as fuel cells, are oriented adjacent one another and electrically interconnected in series, or otherwise, to form a fuel cell stack. Operation of the fuel cells, for example the reaction of hydrogen and oxygen to produce electrical energy as well as water and heat, is exothermic, and cooling of the cell components is necessary in order to maintain component integrity. For example, the bipolar plates or the electrolyte matrix may be made of carbonaceous material bonded by a resin which tends to degrade at high temperatures. Prolonged operation at high temperatures would tend to degrade many components of a typical fuel cell. Further, the exothermic reaction can result in uneven temperature distribution across a fuel cell, thus limiting cell operating temperature and efficiency, and additionally raising concerns about catalyst poisoning, for example by carbon monoxide, as well as raising concerns relating to thermal cycling.

Accordingly, fuel cell systems have in the past been proposed with closed liquid cooling loops. Typically proposed are systems comprising a plurality of stacked cells wherein every fourth cell or so includes small metallic tubing through which cooling water is recirculated. Circulatory power is accordingly required, detracting from overall cell efficiency. This is complicated by large pressure drops in small diameter tubing, and the susceptibility of the cooling tubes to attack by mediums with the cell stack, such as acids in certain designs.

Also proposed are systems wherein large amounts of an oxidant, such as air, in quantities which are multiples of the stoichiometric amount necessary to carry out the electrochemical reaction, are circulated through a stack of fuel cells to additionally function as a cooling medium. As with liquid cooled systems, an associated penalty is the large amount of circulatory power required.

Recently proposed have been systems including a stack of fuel cells with a cooling module placed between every fourth or so fuel cell in the stack. Air is manifolded from a common source so as to flow in parallel through the process oxidant channels of the fuel cells, as well as through cooling channels of the cooling module. The cooling module channels are much larger than the fuel cell process channels so that approximately eighty percent of the air flows through the cooling cell channels and the balance through the process cell channels. While such systems represent an improvement in terms of mechanical power requirements, additional improvements can be made. For example, where the amount of air flow is reasonable, that is, where an amount which does not require excessive circulatory power is utilized, the air flowing through the cooling channels absorbs substantial amounts of heat energy as the cooling channel is traversed, resulting in less cooling at the exit end of the channel. This condition results in an uneven temperature profile in the fuel cell stack and associated unbalanced reaction rates, voltage and current distributions, and limits average operating temperatures.

More recently proposed are systems of the latter described type wherein the cooling channels vary in surface area or spacing within the stack, such that entering coolant is exposed to a smaller surface area than exiting coolant. This substantially improves overall cooling of the fuel cell stack, creating greater uniformity of temperature.

All of the described arrangements, however, may be prone to thermal cycling with changes in operation, such as required load. The variable surface area system also requires increased manufacturing complexity and cost to achieve a degree of thermal uniformity. And, some of the proposed systems create a substantial pressure drop requiring high pumping capacities and system pressures.

It is therefore desirable to provide improved cooling arrangements for fuel cell systems which preferably do not suffer excessively high pressure drops and circulatory power requirements and which provide for better temperature distribution and uniformity throughout the fuel cell system. It is also desirable to minimize the impact of thermal cycling on system components.

SUMMARY OF THE INVENTION

This invention provides method and apparatus for coolinng fuel cell stacks to achieve substantial thermal uniformity and alleviate high pressure drop component requirements. In preferred form a grouping of fuel cells, or a so called stack, contains cooling channels segregated from the process fluid flowing in reacting communication with the anodes and cathodes of the stack. A cooling fluid flows through a recirculating loop which includes, in addition to the fuel cell stack, a heat exchanger, a pump, and a diverter valve.

The recirculating cooling loop is preferably arranged such that cooling fluid exiting the stack is first cooled in the heat exchanger and, at a lower temperature, passed through the pump and returned to the fuel cell stack. The conduits connecting the loop components, and the diverter valve, are arranged so that the direction of cooling fluid flow can be periodically reversed, without stopping or reversing the pump. The same arrangement can also be applied to other fuel cell systems.

The direction of cooling fluid flow is selectively reversed as a function of the thermal time constant of the fuel cell stack. More specifically, reversal in flow direction is made at time intervals which are less than the period of time necessary for the stack to achieve a thermal equilibrium at given operating conditions. Generally, the more rapid the time period for reversals, the more uniform will be the thermal profile of the fuel cell stack.

Whereas the prior art continuously exposed the inlet portions of the stack to cooler coolant than the outer portions, reversal of flow directions provides cooler coolant to one portion of the stack for a period of time, and then the other portion is exposed to the cooler coolant fluid. The inlet and outlet are in essence periodically reversed, and the affect of coolant heating during passage through the stack, detrimentally lowering its capacity for cooling toward the outlet end of the stack, is alleviated. In this manner the thermal storage capacity of the fuel cell stack is utilized in a positive fashion.

BRIEF DESCRIPTION OF THE DRAWINGS

The advantages, nature and additional features of the invention will become more apparent from the following description, taken in connection with the accompanying drawing, in which.

DESCRIPTION OF THE PREFERRED EMBODIMENTS

Figure 1:
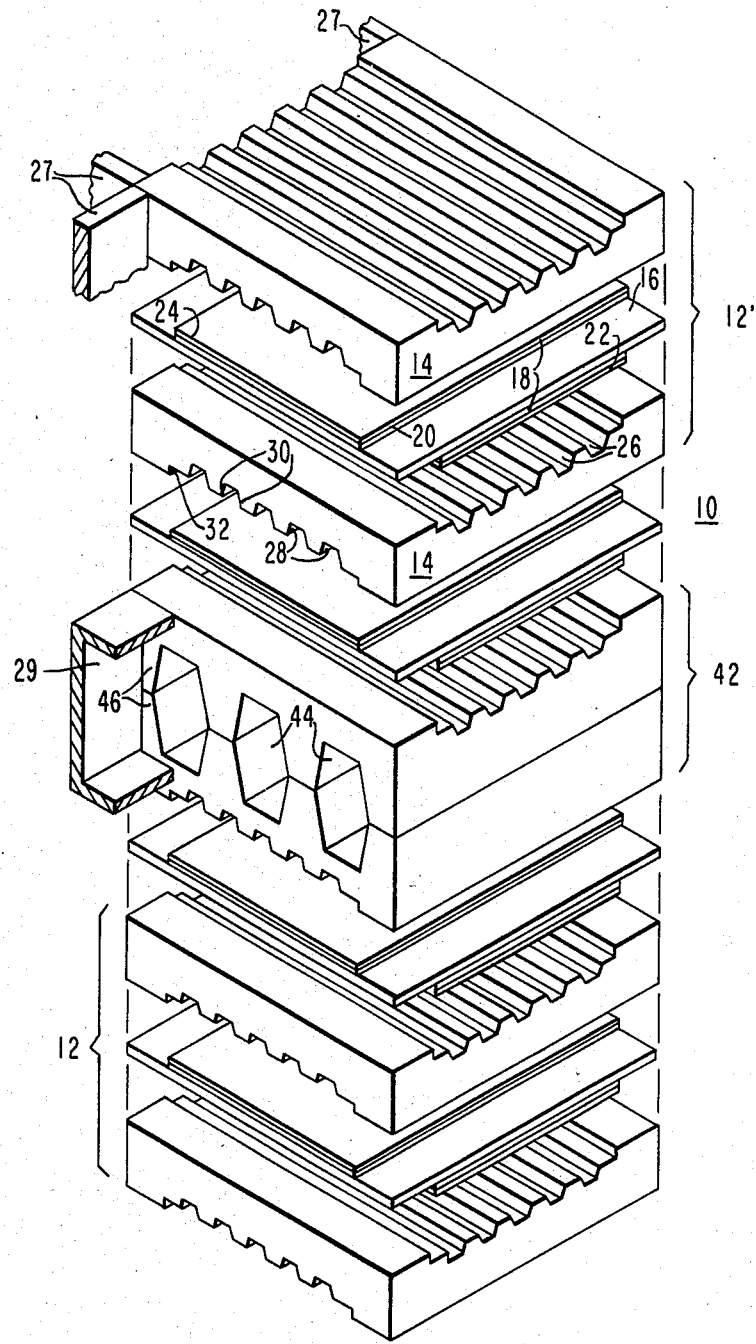
FIG. 1 is an expanded perspective view of an exemplary fuel cell stack.

Referring now to FIG. 1, there is shown an exemplary electrochemical fuel cell stack 10. The stack includes a plurality of repeating fuel cells 12 arranged in an assembly such that the cells 12 are electrically connected in series. Cell stacks can also be arranged in parallel. The term stack, as used in the description and accompanying claims, includes an integrated grouping of electrochemical devices.

An individual cell, such as the cell 12', includes two bipolar plates 14 between which are sandwiched an electrolyte, for example, in the form of a porous graphite matrix 16 saturated with an acid such as phosphoric acid. Many other materials and structures which incorporate an electrically insulating matrix material can also be utilized. The plates 14 can comprise a material such as compression molded graphite-resin composite, disposed on opposite sides of the electrolyte matrix 16 and electrodes 18, such as the cathode 20 and anode 22. Each electrode 18 can also be of coarse graphite material provided with a porous graphite fiber backing 24 for added structural integrity.

The bipolar plates 14 are provided with a set of process channels, including fuel channels 26 and oxidant channels 28. The channels 26, 28 are generally rectangular with slightly slanted edges 30 to facilitate fabrication as necessary, for example, to remove a fabrication die. Other geometric configurations are equally possible. The bipolar plates 14 also include grooves 32 matingly configured to receive the electrodes 18. Thus, when held together by means well known, such as bonding materials and an external frame, each cell represents a substantially sealed unit.

An oxidant, such as a halogen, or air or other oxygen-containing material, flows through the oxidant channels 28, and a fuel, such as hydrogen, organics or metals, flows through the fuel channels 26. Manifolds 27 are typically utilized to transfer the process fuel and oxidant to and from the stack. Electrical power and heat are generated by the interaction of the fuel and oxidant through the electrodes and electrolyte matrix 16. An exemplary fuel cell utilizes hydrogen fuel, air as the oxidant and phosphoric acid as the electrolyte.

A substantial amount of heat is generated by the electrochemical reaction and, accordingly, the system stack 10 includes cooling modules 42 or other cooling means. Dependent upon the operating temperatures desired, the cooling modules 42 are placed between fuel cells 12 at selected positions within the stack 10. A cooling module 42 may, for example, be placed between approximately every third cell to every eighth cell. Manifolds 29 and appropriate seals are provided to transfer a cooling fluid to and from the stack.

Each cooling module 42 is preferably comprised of a material similar to that of the bipolar plates 14, compression molded graphite-resin composite in the exemplary system. The cooling module 42 includes a plurality of cooling channels 44. The cooling module 42 can be formed of one piece, although, as shown, two sections 46 are preferably separately fabricated and subsequently sealed together. The cooling channels 44 are preferably substantially rectangular, although other geometric shapes are equally possible.

The cooling channels 44 may be oriented generally parallel to the oxidant channels 28, and they can also be oriented parallel to the fuel channels 26, or at any other orientation. A cooling fluid flows through the cooling channels 44. In accordance with the invention the cooling fluid and oxidant can be the same medium, such as air, or different mediums can be utilized. For example, the oxidant fluid can be air, and the cooling fluid can be helium.

As the cooling fluid flows within the channels 44, heat generated by the electrochemical reaction is absorbed, and its cooling capacity during passage through the stack 10 progressively decreases.

Figure 2:
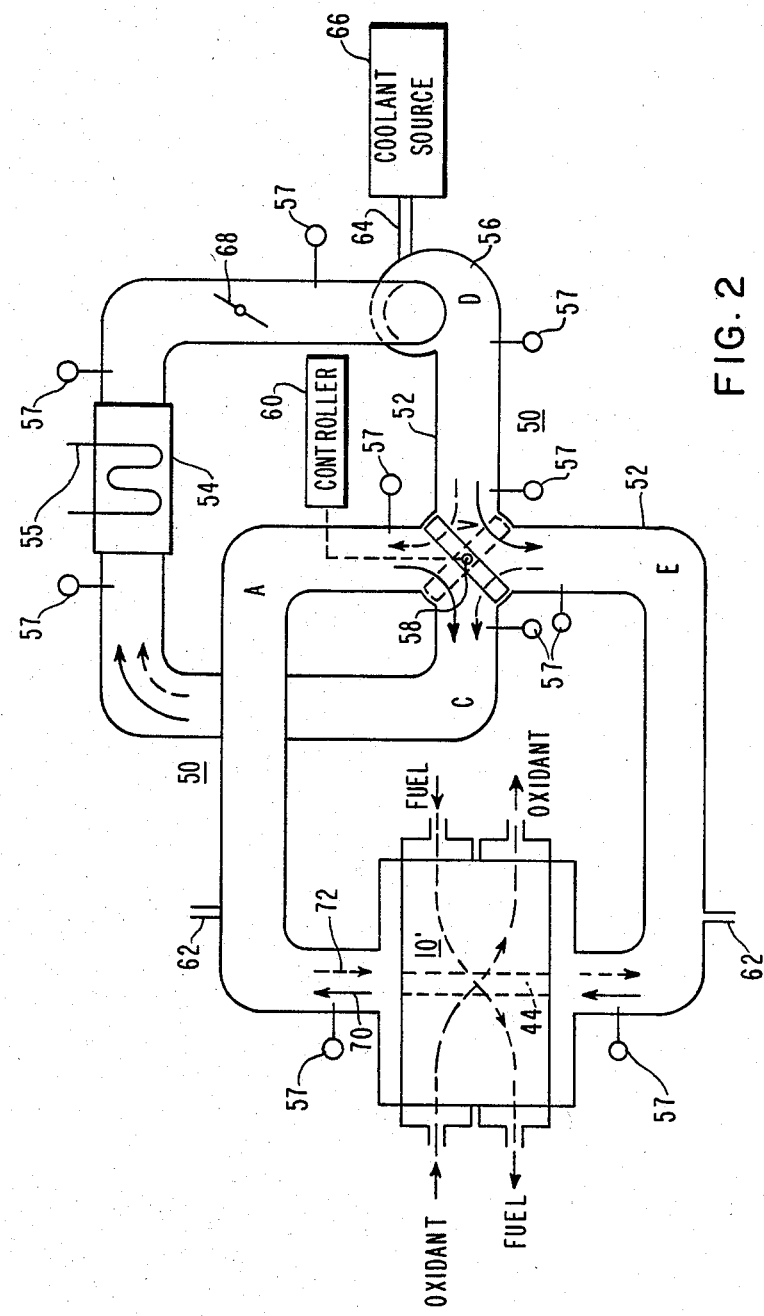
FIG. 2 is a schematic of a cooling circulation loop in accordance with the invention.

Referring now to FIG. 2 there is shown a fuel cell stack 10' wherein the fuel and oxidant flow generally parallel and counterdirectional to one another. A coolant circuit 50, preferably a recirculating loop, passes the coolant fluid from and to the stack 10' through conduits 52. The circuit typically contains a gaseous coolant, such as helium or air, at a pressure of between one and ten atmospheres. The circuit 50 includes a heat exchanger 54 through which a sink fluid in conduit 55 flows, means for pumping coolant through the circuit such as a blower or pump 56, and means for modulating the direction of flow of coolant through the circuit 50 such as a diverter valve 58. The valve 58 preferably is motor operated and modulates between two positions as directed by a controller 60.

The circulating loop 50 also includes one or more vents 62 which can be utlizied to discharge some fluid from the circuit 50, and a makeup conduit 64 which can provide fresh coolant fluid from a coolant source 66. A modulating motor-controlled flow damper 68 can also be utilized to control the amount of coolant fluid provided by the pump 56 to the stack 10'. The speed of the pump can also be varied. The system also includes appropriate temperture, pressure and flow monitors 57, which communicate with known control logic (not shown) to monitor and control system parameters.

The arrangement of FIG. 2 thus allows variation of coolant mass flow, coolant temperature and period of flow reversal, for example as a function of load on the stack, by changing pump speed, flow damper orientation or the rate of flow of sink fluid through the heat exchanger.

The valve 58 is shown by a solid line in one position, and by a broken line in a second position. The flow path of coolant fluid is shown by solid arrows 70, corresponding to the solid line position of the valve 58, and by broken arrows 72, corresponding to the broken line position of the valve 58.

When the valve 58 is in the solid line position, the coolant traverses a path A-V-C-D-V-E. When the valve 58 is in the broken line position, the coolant traverses a path E-V-C-D-V-A. The coolant flow direction is selectively periodically reversed between these two flow paths. The valve 58 allows reversal without stopping, or reversing, of the pump 56. This prevents a given portion of the cells 12 within a stack 10 from always being exposed to, and cooled by, a coolant which is either hotter or colder than the average coolant temperature. When the time period between coolant flow direction reversals is small compared to the thermal time constant of the stack 10, highly uniform fuel cell 10 temperatures are achieved. The temperature variations at a given location will be smaller than the steady state, single coolant direction temperature rise along a cooling path. For approximately half of the operating time, one edge of each cell is cooled by cold inlet coolant, and for the other half of the time it is cooled by warmer exhaust coolant. Positions midway along the cells are continuously cooled by coolant which is near the mean coolant temperature. Similar conditions exist for other internal stack locations.

The thermal time constant relates an initial temperature at a location within the stack to an equilibrium or steady state temperature at steady load conditions. For calculational studies summarized hereinafter, the thermal time constant is defined as the time period to change the temperature of the inlet edge of the cell closest to the cooling module to a temperature corresponding to 63.2 percent of the temperature differential between an initial temperature and an equilibrium or steady state temperature. The time constant for a rectangular stack 10 with fuel cells 12 approximately twelve inches by seventeen inches having a cooling module between every fifth cell is estimated to be 520 seconds, or 8.7 minutes. The calculated response is based upon a stack assumed to provide uniform heat generation utilizing twelve uniformly spaced and constant cross-section cooling channels 44 extending along the twelve inch long cooling path. For a current density of 100 amps per foot squared and a 100° F. rise in the coolant temperature during passage through the stack from approximately 250° F. to 350° F., the steady state temperature differential from the cell outlet to inlet with constant air flow in one direction was 57.8° F. Reversing the direction of flow each 520 seconds, or one time constant, reduces the maximum temperature change to 38.3° F. For 240 seconds between reversals, the maximum temperature change reduces to 20.1° F. and, for 120 second reversal periods the maximum change is 10.7° F.

It will now be apparent that substantial improvement in fuel cell temperature uniformity can be achieved utilizing periodic flow reversal as disclosed. It will also be apparent that periodic flow reversal is compatible with various types of fuel cell system flow configurations including, among others, the arrangements shown in FIGS. 1 and 2. For the stack of FIG. 1, it is preferable that the coolant stream be segregated from the process fluids.

There is a finite period of time associated with the reversal. A volume of warm coolant initially in the exit stream manifolds and conduits will reenter the stack during the reversal sequence. The affect of the warm coolant will not appreciably modify the stack thermal uniformity if the reversal time is a small fraction of the period between reversals, particularly in view of the thermal storage capacity of the system. For typically sized manifolds and ducts, the reversing time period is expected to be in the range of two to three seconds. Thus, selective reversals at one minute time intervals can beneficially be utilized to reduce temperature swings to less than 10° F.

Figure 4:
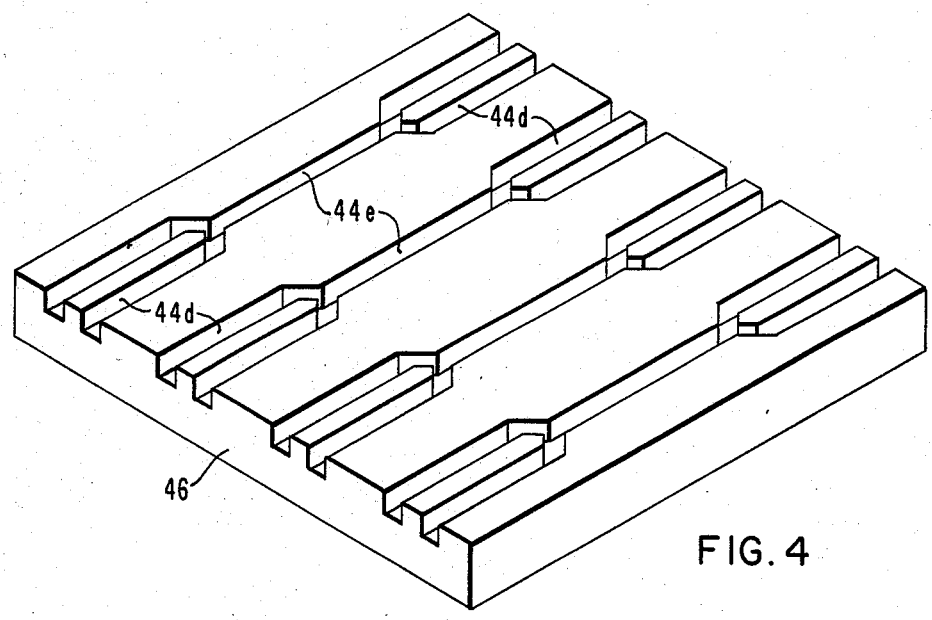
FIGS. 3 and 4 are perspective views of cooling module segments in accordance with the invention.
Figure 3:
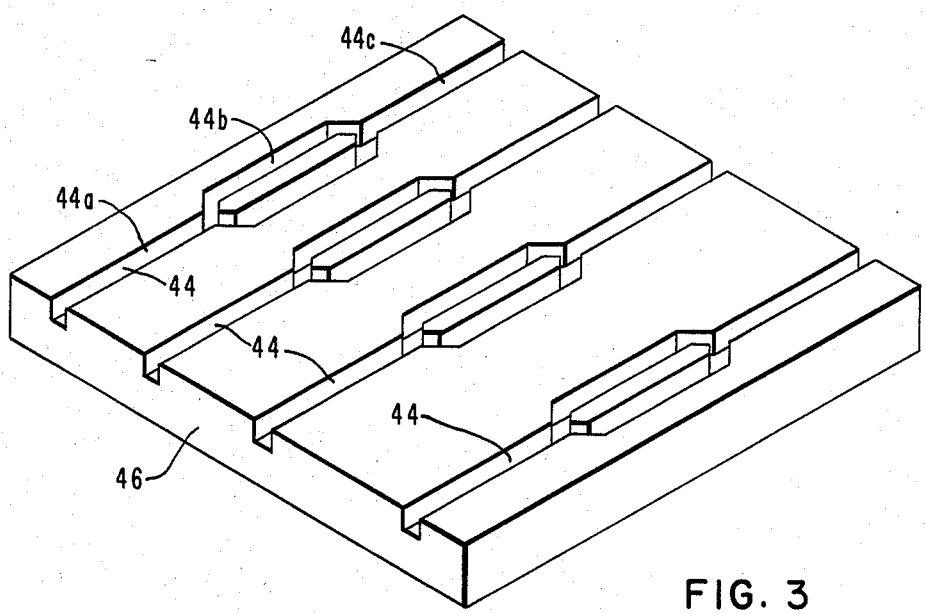

While the foregoing is based upon evenly distributed and sized cooling passages 44, additional benefits and temperature uniformity may be achieved through variation in the spacing, the shape and the layout of the coolant channels. For example, FIG. 3 shows a cooling module section 46 having cooling channels 44 which are spaced closer together toward the lefthand edge than toward the righthand edge. Such spacing is useful where heat generation in a stack is higher at the lefthand side, for example, where fresh fuel and oxidant are both fed into the stack from the left edge. The channels 44 also include three sections, 44a, 44b and 44c. Sections 44a and 44c provide less internal surface area than section 44b. This orientation is particularly beneficial in conjunction with periodic flow reversal and where higher temperatures, or higher temperature swings, are expected at the central regions of the fuel cell stack. Alternatively, dependent upon the process reaction rate at given locations across the fuel cells, it may be desirable to provide high surface area channel sections 44d at the cooling module extremities, and smaller surface area sections 44e at the interior of the module, as shown in FIG. 4.

Many additional modifications are possible without departing from the spirit and scope of the disclosure. It is therefore intended that the foregoing description be taken as illustrative, and not in a limiting sense.

I claim:

1. An electrochemical generation system comprising a stack of a plurality of fuel cells; a cooling module; means for selectively periodically reversing the direction of flow of a coolant fluid through said cooling module; process channels within said stack for flow therethrough of an oxidant and a fuel, and coolant channels within said cooling module segregated from said process channels, for flow of said coolant therethrough; and wherein the surface area of said coolant channels varies through said cooling module from a large value at the center of said cooling module to a smaller value towards the edges of said cooling module.

* * * * *